(12) United States Patent
Wolff et al.

(10) Patent No.: US 7,949,666 B2
(45) Date of Patent: May 24, 2011

(54) SYNCHRONIZING DISTRIBUTED WORK THROUGH DOCUMENT LOGS

(75) Inventors: Gregory J. Wolff, Redwood City, CA (US); Kurt W. Piersol, Campbell, CA (US)

(73) Assignee: Ricoh, Ltd., Tokyo (JP)

( * ) Notice: Subject to any disclaimer, the term of this patent is extended or adjusted under 35 U.S.C. 154(b) by 760 days.

(21) Appl. No.: 10/887,998

(22) Filed: Jul. 9, 2004

(65) Prior Publication Data
US 2006/0010095 A1     Jan. 12, 2006

(51) Int. Cl.
*G06F 7/00*       (2006.01)
*G06F 17/30*      (2006.01)

(52) U.S. Cl. ......... 707/753; 707/803; 713/165; 380/281
(58) Field of Classification Search .................. None
See application file for complete search history.

(56) References Cited

U.S. PATENT DOCUMENTS

| | | | |
|---|---|---|---|
| 4,809,158 A | | 2/1989 | McCauley |
| 5,396,622 A | | 3/1995 | Lee et al. |
| 5,495,608 A | | 2/1996 | Antoshenkov |
| 5,592,618 A | | 1/1997 | Micka et al. |
| 5,708,780 A | | 1/1998 | Levergood et al. |
| 5,778,388 A | | 7/1998 | Kawamura et al. |
| 5,845,292 A | | 12/1998 | Bohannon et al. |
| 5,949,876 A | * | 9/1999 | Ginter et al. |
| 6,065,018 A | | 5/2000 | Beier et al. |
| 6,192,365 B1 | | 2/2001 | Draper et al. |
| 6,236,988 B1 | * | 5/2001 | Aldred ................................. 1/1 |
| 6,289,356 B1 | | 9/2001 | Hitz et al. |
| 6,308,175 B1 | * | 10/2001 | Lang et al. |
| 6,341,316 B1 | * | 1/2002 | Kloba et al. |
| 6,345,288 B1 | * | 2/2002 | Reed et al. |
| 6,360,215 B1 | * | 3/2002 | Judd et al. |
| 6,363,363 B1 | | 3/2002 | Haller et al. |
| 6,418,421 B1 | * | 7/2002 | Hurtado et al. .................. 705/54 |
| 6,463,427 B1 | | 10/2002 | Wu |
| 6,546,385 B1 | * | 4/2003 | Mao et al. |
| 6,574,627 B1 | | 6/2003 | Bergadano et al. |
| 6,584,477 B1 | | 6/2003 | Mosher, Jr. |
| 6,615,208 B1 | * | 9/2003 | Behrens et al. |
| 6,631,469 B1 | * | 10/2003 | Silvester |
| 6,631,496 B1 | * | 10/2003 | Li et al. ......................... 715/200 |

(Continued)

FOREIGN PATENT DOCUMENTS

EP     1 594 252     * 11/2005

(Continued)

OTHER PUBLICATIONS

U.S. Office Action for corresponding U.S. Appl. No. 11/804,635, Jun. 22, 2009, 9 pgs.

(Continued)

*Primary Examiner* — Cam Y T Truong
(74) *Attorney, Agent, or Firm* — Blakely, Sokoloff, Taylor & Zafman LLP

(57) ABSTRACT

A method and apparatus is disclosed herein for synchronizing distributed work. In one embodiment, the method comprises receiving first and second metadata entries, adding the first and second metadata entries to a set corresponding to a digital object, and providing access to first and second unique identifiers used for referencing the first and second metadata entries respectively, where the first and second unique identifiers are based on contents of the first and second metadata entries respectively.

69 Claims, 12 Drawing Sheets

U.S. PATENT DOCUMENTS

| | | | |
|---|---|---|---|
| 6,640,301 B1* | | 10/2003 | Ng |
| 6,687,696 B2* | | 2/2004 | Hofmann et al. |
| 6,697,948 B1* | | 2/2004 | Rabin et al. |
| 6,754,773 B2* | | 6/2004 | Ulrich et al. |
| 6,862,728 B2 | | 3/2005 | Darnell et al. |
| 7,054,626 B2 | | 5/2006 | Rossmann |
| 7,203,796 B1 | | 4/2007 | Muppalaneni et al. |
| 7,278,115 B1 | | 10/2007 | Conway et al. |
| 7,340,450 B2 | | 3/2008 | Sugahara et al. |
| 7,406,487 B1 | | 7/2008 | Gupta et al. |
| 7,478,120 B1 | | 1/2009 | Zhang |
| 2002/0023221 A1 | | 2/2002 | Miyazaki et al. |
| 2002/0046072 A1 | | 4/2002 | Arai et al. |
| 2002/0055942 A1 | | 5/2002 | Reynolds |
| 2002/0095454 A1 | | 7/2002 | Reed et al. |
| 2002/0120484 A1 | | 8/2002 | Bantz et al. |
| 2003/0021677 A1 | | 1/2003 | Masutani |
| 2003/0046586 A1 | | 3/2003 | Bheemarasetti et al. |
| 2003/0050863 A1 | | 3/2003 | Radwin |
| 2003/0053655 A1 | | 3/2003 | Barone et al. |
| 2003/0088593 A1 | | 5/2003 | Stickler |
| 2003/0123447 A1 | | 7/2003 | Smith |
| 2003/0126148 A1 | | 7/2003 | Gropper et al. |
| 2003/0158944 A1 | | 8/2003 | Branson et al. |
| 2003/0212677 A1 | | 11/2003 | Chen et al. |
| 2003/0236857 A1 | | 12/2003 | Takase et al. |
| 2004/0030681 A1 | | 2/2004 | Shannon et al. |
| 2004/0064833 A1 | | 4/2004 | Lee et al. |
| 2004/0075866 A1 | | 4/2004 | Thormodsen et al. |
| 2004/0177067 A1 | | 9/2004 | Takeda |
| 2004/0225655 A1 | | 11/2004 | Moulton |
| 2004/0244039 A1* | | 12/2004 | Sugahara et al. ............... 725/52 |
| 2004/0260593 A1 | | 12/2004 | Abraham-Fuchs et al. |
| 2005/0038809 A1 | | 2/2005 | Abajian et al. |
| 2005/0055343 A1 | | 3/2005 | Krishnamurthy |
| 2005/0071209 A1 | | 3/2005 | Tatavu et al. |
| 2005/0091229 A1 | | 4/2005 | Bali et al. |
| 2005/0114709 A1 | | 5/2005 | Moore |
| 2005/0210059 A1* | | 9/2005 | Albornoz et al. ............. 707/102 |
| 2005/0262243 A1 | | 11/2005 | Ternasky et al. |
| 2005/0267885 A1 | | 12/2005 | Klier |
| 2005/0289187 A1 | | 12/2005 | Wong et al. |
| 2006/0101007 A1 | | 5/2006 | Go |
| 2006/0129576 A1* | | 6/2006 | Carpentier et al. ........... 707/100 |
| 2006/0149558 A1 | | 7/2006 | Kahn et al. |
| 2006/0150079 A1 | | 7/2006 | Albornoz et al. |
| 2006/0218204 A1 | | 9/2006 | Ofer et al. |
| 2006/0230081 A1 | | 10/2006 | Craswell et al. |
| 2007/0024490 A1 | | 2/2007 | Carter et al. |
| 2007/0094467 A1 | | 4/2007 | Yamasaki |
| 2007/0143356 A1 | | 6/2007 | Kleinsmith et al. |
| 2007/0219942 A1 | | 9/2007 | Wolff et al. |
| 2007/0244920 A1 | | 10/2007 | Palliyil et al. |
| 2008/0019505 A1 | | 1/2008 | Thomas |
| 2008/0071646 A1 | | 3/2008 | Hodson et al. |
| 2008/0104407 A1 | | 5/2008 | Horne et al. |
| 2008/0243688 A1 | | 10/2008 | Hart et al. |

FOREIGN PATENT DOCUMENTS

| | | | |
|---|---|---|---|
| EP | 1622074 | * | 2/2006 |
| WO | WO 03071394 | * | 8/2003 |

OTHER PUBLICATIONS

U.S. Final Office Action for corresponding U.S. Appl. No. 11/804,635, Jan. 7, 2010, 9 pgs.

U.S. Office Action for corresponding U.S. Appl. No. 11/804,435, Jun. 18, 2009, 10 pgs.

U.S. Office Action for corresponding U.S. Appl. No. 11/804,435, Dec. 30, 2009, 7 pgs.

U.S. Office Action for corresponding U.S. Appl. No. 11/804,635, Jul. 22, 2010, 15 pgs.

U.S. Final Office Action for corresponding U.S. Appl. No. 11/804,435, Jun. 7, 2010, 11 pgs.

Google Search, "creating hash values as identifiers," http://www.google.com/search?hl=en&rls=GGLD%2CGGLD% . . . h+values+as+identifiers &aq=f&aqi=&aql =&oq=&gs_rfai=, Apr. 7, 2010, 2 pages.

"ATTRIB," PC Computer Notes & Online Tutorials, http://web.archive.org/web/20021204074423/http://www.pccomputernotes.com/operating_systems/dos04.htm, Dec. 4, 2002, 5 pages.

"EP180410 International Search Report," EP Appl No. 06027063.4-1527, Apr. 18, 2007, 6 pages.

Blanton, "Microsoft Computer Dictionary," Microsoft Press, Fifth Edition, Jan. 22, 2002, p. 578.

Flickr, "Photo tags," http://web.archive.org/web/20040607054247/http://www.flickr.com/photos/tags/, Jun. 7, 2004, 1.

Hisashi,Toyoshima, et al, "Hysteresis Signature and its Related Technologies to Maintain the Digital Evidence for Network Activities in Future Soceity," Journal of the National Institute of Information and Communications Technology, vol. 52, Nos. 1/2, 2005, pp. 191-201.

Phan, et al, "Challenge: Integrating Mobile Wireless Devices Into the Computational Grid," MOBICOM'02, Sep. 23-28, 2002, pp. 271-278.

Tkachenko, "Log file in XML format?," (http://www.tkachenko.com/blog/archives/000053.html) Jul. 22, 2003, 1-4.

European Search Report dated Oct. 31, 2008, for European Application No. 08153371.3, 7 pages.

U.S. Office Action for corresponding U.S. Appl. No. 11/322,435, (P179) dated Jan. 4, 2010.

U.S. Office Action for corresponding U.S. Appl. No. 11/322,435, (P179) dated Jan. 30, 2009.

U.S. Office Action for corresponding U.S. Appl. No. 11/322,435, (P179) dated Feb. 15, 2008.

U.S. Final Office Action for corresponding U.S. Appl. No. 11/322,435, (P179) dated May 7, 2010.

U.S. Final Office Action for corresponding U.S. Appl. No. 11/322,435, (P179) dated Sep. 11, 2008.

U.S. Final Office Action for corresponding U.S. Appl. No. 11/322,435, (P179) dated Jun. 25, 2009.

U.S. Office Action for corresponding U.S. Appl. No. 11/692,784, (P206) dated Jul. 22, 2009.

U.S. Office Action for corresponding U.S. Appl. No. 11/692,784, (P206) dated Aug. 5, 2008.

U.S. Final Office Action for corresponding U.S. Appl. No. 11/692,784, (P206) dated Jun. 9, 2010.

U.S. Final Office Action for corresponding U.S. Appl. No. 11/692,784, (P206) dated Feb. 3, 2009.

* cited by examiner

```
<doc SHAI = A...>
    <entry SEQ = I
           SHAI = C...>
        First comment on doc A
    </entry>
    <entry SEQ = 2
           SHAI = D...
           HREF = URL
           SRC = URL>
        Another comment
    </entry
    ...
</doc>
``` http://RP.net/A/
XML listing of comments on document "A"

FIG. 3

SYNCHRONIZING DISTRIBUTED WORK THROUGH DOCUMENT LOGS

FIELD OF THE INVENTION

The present invention relates to the field of digital object distribution; more particularly, the present invention relates to synchronizing information corresponding to a digital object.

BACKGROUND OF THE INVENTION

Millions of documents are sent back and forth every day. Substantial effort and time is spent in the overhead of addressing these documents. In the workplace, this substantial time and effort results in increased cost and expense.

One typical problem with documents involves the synchronization of distributed work. Synchronization of distributed work involves the arrangement of work. When the work involves a document, such synchronization may involve coordinating the information corresponding to the document. For example, when a number of parties are making comments about a document, the comments may be arranged and/or ordered to provide a better understanding or a more complete state of the document's review.

Many document management systems have been proposed and implemented in the past. These document management systems include systems that store documents and handle the coordination of requests with responses. However, these systems do not cur across organizational boundaries and do not perform the synchronization that is necessary.

A Web log is an online document management tool used to record information. Web logs use a client-server framework to permit the addition or subtraction of content from one or more client locations to a server that hosts the web log. Because one server hosts each web log, web logs are typically anchored to a particular HTTP location.

SUMMARY OF THE INVENTION

A method and apparatus is disclosed herein for synchronizing distributed work. In one embodiment, the method comprises receiving first and second metadata entries, adding the first and second metadata entries to a set corresponding to a digital object, and providing access to first and second unique identifiers used for referencing the first and second metadata entries respectively, where the first and second unique identifiers are based on contents of the first and second metadata entries respectively.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3 illustrates an exemplary sketch of a XML file that represents the log associated with a document;

DETAILED DESCRIPTION OF THE PRESENT INVENTION

Figure 1:
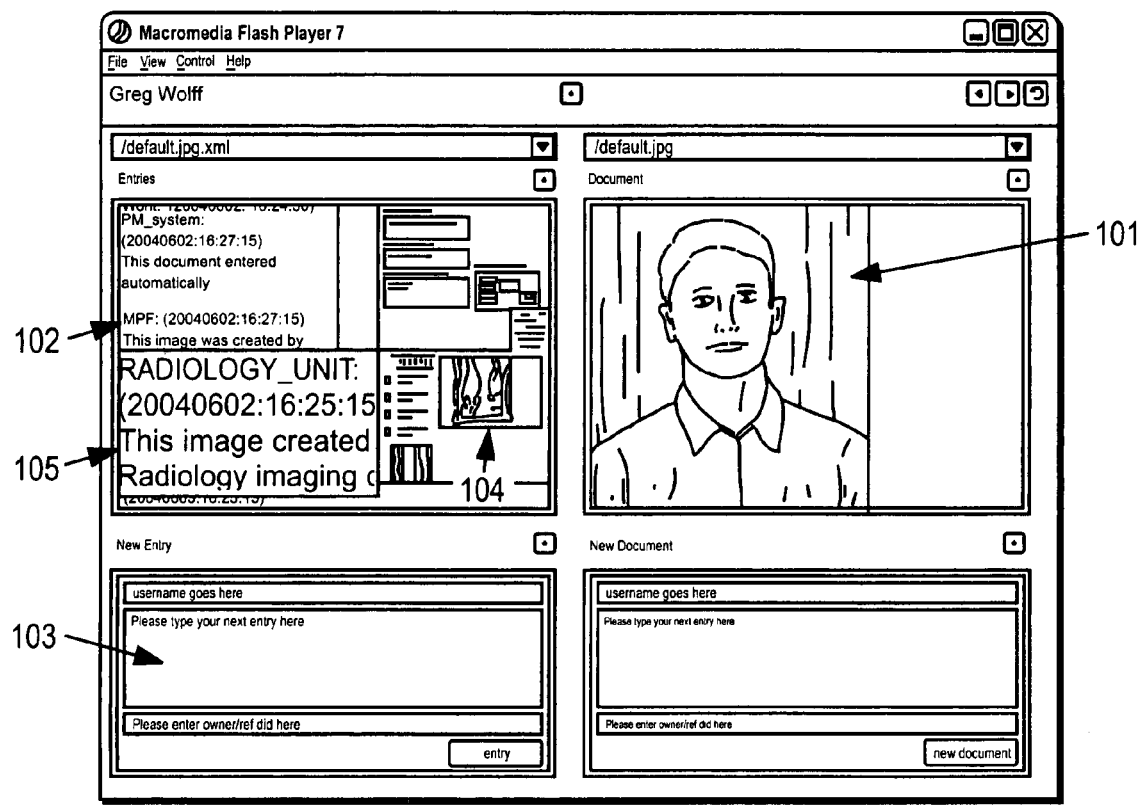
FIG. 1 illustrates an exemplary user interface.

A method and apparatus for synchronizing data centered around digital objects (e.g., documents) that scales up to arbitrary sized groups or sets. In one embodiment, the synchronization is performed using a conceptual framework referred to herein as "document logs." Document logs are similar to Web logs. Document logs differ from Web logs in that they are anchored to a particular document, rather than the HTTP location that anchors web logs.

In one embodiment, a document log has log entries. Individual log entries consist of metadata. The metadata may comprise short text messages and/or optional links entered by one or more people or automated systems. The document log may be distributed. In one embodiment, the document log is distributed as XML.

Unlike the client/server framework of weblogs, document log distribution and processing is a process distributed among nodes (e.g., units, devices, etc.) connected in a network. The process can be arbitrarily scaled. In one networked environment, each node minimally provides caching and synchronization for log entries, and the ability to exchange entries with other nodes. Additionally, user interface nodes (e.g., clients) provide views of entries and the anchoring document along with a mechanism for adding new entries and/or following links.

In one embodiment, for any given document log or set of logs, a single node is designated as responsible for synchronizing log entries. The role of this "synchronizing" node is to synchronize distributed work similar to the role that domain name servers (DNS) provide for converting domain names into locations (IP addresses). The synchronizing node may be a server. In particular, the synchronizing node provides a canonical ordering of entries for each document log. In other embodiments, such synchronization may be performed locally by serving a single workgroup or globally via a Web service corresponding to the root domain name server). Two nodes that agree to use the same synchronizing node can then rely on having the same ordering for the entries.

In addition to describing a system architecture and operation, a method and apparatus for processing a transaction using a global rendezvous point service is described. In essence, an entity wishing to have their log entry added to the canonical sequence of entries for a document pays a transaction fee to the service. Once an indication has been generated indicating that payment as been received, the log entry may be added.

In one embodiment, document logs are used in conjunction with encryption to provide secure exchange of documents without trusted third parties.

Taken together, document logs and associated processing provide basic building blocks useful for content management and distribution including version tracking, flexible filesharing, synchronization, and the like. Unlike existing document management systems, source code repositories, or other existing mechanisms to achieve these goals, in one embodiment, document logs require no software installation or administrative maintenance. Furthermore, document logs provide the flexibility for users to efficiently work together.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Document Logs in General

A log (e.g., document log) consists of a digital object along with one or more sets of metadata. The digital objects can be represented as a sequence of bytes. The digital object may be a document and the metadata may correspond to a set of comments associated with the document. Thus, for each document, there exists a set of comments associated with that document. Comments, which generally consist of text strings, may be documents themselves and could consist of arbitrary byte strings. Comments may be simple text entries that might refer to other documents and can be created by anyone or anything. In the context of a draft technical paper, a set of comments might represent feedback from different reviewers. In the context of a photograph (e.g., jpeg file), the set of comments might include stories about the event depicted in the photograph such as a birthday party. In the context of a patient chart, the set of comments might include references to individual appointments or visits for the patient.

Techniques are described herein for exchanging and merging the lists of comments associated with a document together (without conflicts).

In one embodiment, document logs are represented using a simple XML format that specifies the "anchoring" document and list of entries. For example, a format such as the simple syndication (RSS) format could easily be adapted to serve the same purpose.

In one embodiment, an exchange mechanism is used to enable two nodes to exchange a list of entries. In one embodiment, the nodes use the HTTP GET methods to retrieve the XML file corresponding to a document log and the HTTP POST method to send an XML with (new) entries to a node. For purpose herein, GET will refer to the action of retrieving content associated with a locator, whether used as part of HTTP or not. Alternatively, other exchange mechanisms, including simple file copy operations, may be used.

A node may include a user interface to enable an individual to view and add to the document log entries. Many user interfaces are possible for viewing and adding to document logs. An exemplary user interface is shown in FIG. 1. Referring to FIG. 1, a representation of the image 101 on the right hand side and document log entries 102 on the left-hand side. On the bottom of the left-hand side is a text box 103 that allows the user to type in a new entry.

FIG. 1 shows a prototype user interface for viewing of a document log. In this example, the document is an image (e.g., corresponding to a patient) and the entries correspond to information about that patient. These entries include links to other documents, such as appointments or procedure results, and their associated logs. Thus, the user interface of FIG. 1 facilitates a hypothetical use for tracking patient information. On the right side of FIG. 1 is a document, in this case a picture of the patient. Log entries 102 are entries associated with the patient. Some of these entries are manually typed in by office staff, physicians, or the patient themselves, and other entries are created automatically by related systems, such as a scheduling system or radiologic imaging machines. For each entry in such a document log, a link to another document may be included in the entry. A small thumbnail 104 of the related document is shown to the right of that entry.

Figure 2:
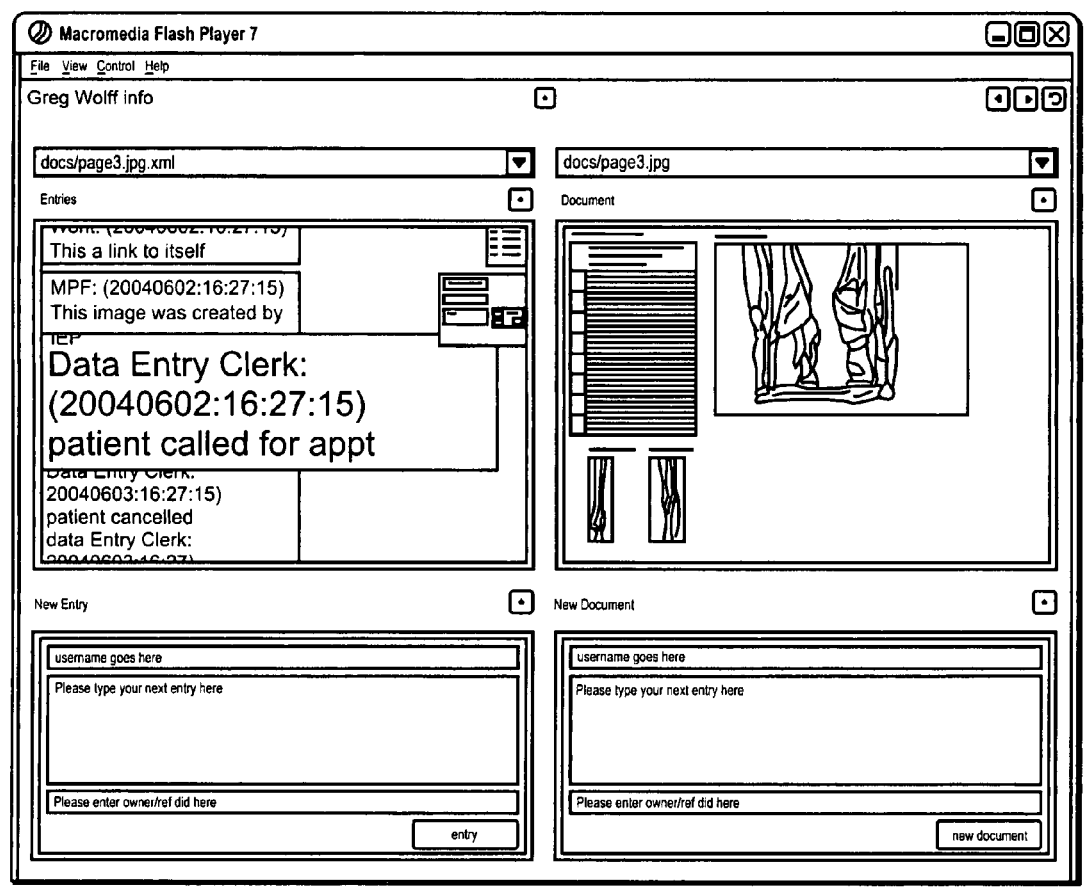
FIG. 2 illustrates the view of a log associated with the radiology image that was referenced by the highlighted comment in FIG. 1.

In one embodiment, the "active" comment underneath the cursor is enlarged with a fisheye effect to enable rapid browsing of many comments within a single list. In one exemplary user interface, entry 105 underneath the mouse cursor is enlarged so as to be easily visible. In the example shown here, the highlighted entry may have been created automatically by a machine in a manner well known in the art. The identifier for the document log shown might have been entered into the machine by use of a bar code or other mechanism on a printed version of this document log. An item that was automatically entered into the original document log includes a link to the document log containing the imaging results created automatically by the imaging machine. Clicking on any of entries 102 takes the user to the document log associated with that entry. Clicking on a comment that has been associated with a link that points to a related document takes the user to the view of the document and log associated with the referenced document. FIG. 2 shows the view of a log associated with the radiology image that was referenced by the highlighted comment in FIG. 1. Referring to FIG. 2, a document that was produced automatically by an x-ray machine and the comments that have been associated with that document are shown.

In some cases, that log will have an entry pointing back to the original log, but in many cases it will not. Navigation tools at the top of this prototype viewer provide forward and backward functions similar to a standard web browser.

In addition to images, document types may include word-processing files, flash paper, Excel files, text documents, or any other type of data. In the current system, any single file (or individually addressable unit) can be used as a "document."

Documents as Locations

Conceptually, a document log may represent a virtual space or (file) hierarchy. The origin of the space—a "root" node—is defined by the document itself. Directory names could be used specify locations of the virtual space. However, in one embodiment, instead of using directory names to specify location, the hash values of the documents themselves are used to specify location of documents and comments on the virtual space or file hierarchy. For example, /A/C represents a comment (c with C=SHA1(c)) on a document (a with A=SHA1(A)), where SHA1 is a hash function that maps an arbitrary sequence of bytes into a fixed size sequence. That is, the letter A is used to indicate the hash of object a, A=SHA1 (a) where A represents any sequence of bytes. For example the string "This is a character string." maps into '97d981dad06b03622cbf8e1a5642724cbcae64f8' (using hexadecimal notation).

The storage associated with this representation could be a standard directory structure, for example, A as the name of a directory and C as the name of a file containing the comment on a. Other storage mechanisms, such as a database using the hash values as primary keys, would work equally well and any node may use one or more such storage mechanisms. A confusing case in which the value of a is itself a string which can be interpreted as a path or a uniform resource locator (URL). If a='http://foo.com/path/to/file.ext' then it may be ambiguous whether c is a comment about the location, is a comment about a web page whose contents might change, or a comment about the contents of that web page at some particular point in time. In the latter case, it is safer to use the hash of the contents (if available) as the anchoring document rather than the hash of the reference string as the anchor.

Note that if a is a string and a valid URL, then individual nodes may choose to combine comments on the string as well as comments on the "known" contents that have been obtained from that URL. Also note that by convention, the document log of a might include an entry for each of the contents that has been available from a along with the pointers to the document log associated with this particular contents.

For purposes of the description herein, in one embodiment, a document is an immutable object identical to a particular sequence of bytes, and the hash value of a document is used as a reference to that document. Since different versions of a document have different hash values, the different versions are considered to be different documents. (By convention if D2 is a new version of document D1, the log of document D1 will have an entry pointing to D2 and the log of D2 will have an entry pointing back to D1.)

More specifically with respect to the use of hash functions and directory structures, for example, a JPEG file, a Word document, a postscript document, a text string, etc. $a_u$ indicates a location (e.g., a URL) of object a, such as http://www.server.com/path/a.jpg or file:///path/to/a.jpg $$a=GET(a_u)$$

(a is the result of de-referencing $a_u$)

Let $A_u$ denote the set of locations $a_u$ for which SHA1(GET$(a_u)$)==A

Note that $A_u$ indicates a location that returned a string representation of A.

A new "virtual" SHA1 protocol may be defined as follows: SHA1://host.name/A/B/C that represents a relationship between A, B, C and their corresponding values, a, b, and c. The value b is a comment (or document log entry) on a, while c is a comment on b.

As with any URL, if GET(SHA1 : //host.name/A/B/C) succeeds, it returns some content as a string of bytes. Unlike other protocols, this content is c and therefore is not just identical for any host, but is also be immutable. In other words, it is an error if SHA1(GET(SHA1 : // . . . /C)) does not equal c. Thus, if a node has a copy of c, then it does not need to perform any communications to return GET(SHA1:// . . . /C) (assume that clients compute SHA1(c) and store the results and any lookup table using C as the key).

Note that just as the same image file may be located in several places, the same comments may be related to several documents. If c is a comment on b, then both SHA1:///A/B/C and SHA1:///B/C are valid URLs. The comment c might also be a comment on document X, in which case SHA1:///X/C would also be valid. Valid in this sense means that someone or some process actually added c as a comment on documents x and b Document Log Listings By convention a trailing slash is used to indicate a listing of comments associated with a document. In one embodiment, GET(SHA1 : //host.com/A/) returns from host.com a listing of comments on document a (in the standard XML format). Likewise, SHA1://foo.com/A/ refers to a listing from host foo.com. /A/ is a reference to the locally known comments on a. SHA1://host.com/A/C/ refers to a listing of comments on comment a from host.com, etc.

An exemplary algorithm for performing lookup of HIA/C is as follows:

a) check local storage for C (storage can be hash table, database, file directory, etc.)

b) if available, then get and return associated value (e.g., content) (Note if instead the set, C/, is being looked up, then add the associated set to results and (optionally) continue check local storage for A, if found, then get associated set of comments)

c) compute hashes of comments d) if any comment has hash C, return that comment e) look up domain name H (which may also be a hash of the string corresponding to a URL, which is handled below)

f) send GET request to H with A/C g) return results (and optionally check for valid hash)

h) send the request to one or more preconfigured servers (note that the servers may have been previous locations for getting A or a)

i) if H is a hash of a URL, h, then use that URL in a normal GET request that should return a The h/ or h.xml or similar standard variations on h can be used by the client as a request to the server for list of comments (e.g., XML file), which can be used to compute C (e.g., if c is one of the entries in that file).

Clients may also maintain a list mapping A to u1 and u2, where u1 is a set of locations from which the client has obtained a (or information based on a) and u2 are locations containing comments on a (e.g., XML files). In an alternative embodiment, the client may simply look up u2, retrieve the associated set(s) of comments, and attempt to compute C.

Mapping Between SHA1: and HTTP: URLs

In one embodiment, clients define and maintain their own mapping from particular contents to locations. For example, suppose r is the contents of Ricoh Innovations homepage. Then $r_u$ is http://www.rii.ricoh.com/ and R='c2c0bfe479dd6da1d58ec4d0c42c5c7c10a1acfe' (that is the hash value of 'Welcome to RII' which for this example is the entire contents of index.html==r).

In this case, a client might maintain an internal table with the following entries:

| SHA1 (R) | HTTP: ($r_u$) | Notes |
|---|---|---|
| c2c0bfe479dd | http://www.rii.ricoh.com/ | The "original" URL. (Note that the has value has been truncated here to conserve space) |
|  | /cache/c2c0bfe479dd/file.html | a local copy of the document contents |
| /c2c0bfe479dd/ | http://www.rii.ricoh.com/rss.xml | A conventional place to find comments associated with a particular web site. |
|  | /cache/c2c0bfe479dd/rss.xml | Local listing of known entries on this document. |

Note that the hash values do not need to be of the same length. In particular, the more bits of the hash value that are specified, the more "secure" the value is. Therefore, in cases where an encryption key, K, is discussed herein as being based on the content and an identifier, I, based on the content, K and I could be different portions of the output of the same algorithm or they could be the output of different algorithms. That is, although I is the hash of x and K is the hash of I. Equally well, I could be the first 80 bits and K could be bits 81-160 of the same hash computation.

Note that there is no requirement for a node or server which stores, processes, presents, or adds to a document log for A to actually have access to the content a. However, by convention for a server, for example, cache.com, that actually does have a cache or copy of the contents of documents, it can provide those contents in response to requests for the document, such as http://cache.com/A, and provide the list log entries in response to http://cache.com/A/. In this case, the path component of the HTTP: and SHA1: URLs that refer to the same document could be identical.

To retrieve an individual comment, the client might request http://cache.com/A/C (Again, note that cache.com may have access to and return c even if it does not have access to a.) If c refers to another document, b by location (e.g., HREF=HTTP://foo.com/b.html so $b_u$=HTTP://foo.com/b.html), then the client might be able to retrieve b from $b_u$, calculate B and locate the document log entries associated with B, via GET(SHA1:///B/). In one embodiment, by default the client checks and integrates log entries from several locations including the rendezvous point server, its local cache, foo.com/b.html.xml, and so forth.

Of course, c might also specify that link by a SHA1: URL (e.g., $b_u$=SHA1:/B) in which case the client uses some mechanism for identifying the location from which to download the actual contents b if it did not already have b or an alternative HTTP: version of $b_u$.

Synchronization Between Two Nodes

In one embodiment, an individual client keeps a local cache of entries for each document. These may be stored in a hash table. The local cache may be any memory space or storage location. In one embodiment, the entry for each hash consists of 2 parts. The first part is either a string containing the actual content itself and/or one or more pointers to the actual content (if available), and the second part is a list of hash values that correspond to comments on this document. The client can be configured to check one or more places for lists of entries. In one embodiment, a default location is rendezvous point, or synchronizing server, which might be checked periodically, such as, for example, whenever the user views a document.

When the client obtains additional entries, e.g., the result of a GET operation, those entries are added to the local cache (consistency checks may be done to ensure that the content is equal to the hash value) and the local list of entries is updated to reflect the new entries. (Information such as the sequence number obtained from a synchronizing server may be used to order this list for presentation.)

Note that nodes in one embodiment of the system of exchange are symmetric. The only difference between a client and server is that the client is defined as the machine that initiates communication—using GET to retrieve an entry listing or POST to send a listing. Of course, different nodes (in particular ones that act as servers) might also differ in their configuration, most especially in whether or not will accept entries from particular nodes (clients).

Nodes might keep track of their communication with other nodes (either other clients or servers) and send only "new" entries to the other node (either via a POST or in response to a GET).

Also note that additional exchange protocols may be used, such as, for example, simply copying and appending the contents of two XML files that refer to the same document log into a single file.

Any number of XML representations could be used for the document log entries. FIG. 3 shows an exemplary sketch of a XML file that represents the log associated with document A. In addition to the content ("First comment on doc A"), each entry has a number of attributes that may be assigned by the originator of the entry or another node. In FIG. 3, the SEQ attribute is assigned by the rendezvous point server. This XML document itself would be returned in response to a query for the document log associated with A, by convention this query takes the form //rp.com/A/ where "rp.com" is the host name for the rendezvous point. (Other servers/hosts would return their own versions of this listing. The sequence numbers provided by the rendezvous point are designated as "canonical.") Note that the HREF attribute on an entry specifies a link to another document similar to the HREF attribute of an anchor ia href= . . . i<a href= . . . >tag in HTML. Likewise, the SRC tag is analogous to the SRC attribute of the HTML IMG tag and specifies the source of a thumbnail image representing the referenced document.

Another possibility would be to use the existing really simple syndication (RSS) schema. A simple extension to RSS that identifies the base document ("anchor") for the RSS feed would enable the uses identified herein. Alternatively, instead of extending RSS, existing fields in RSS may be used.

Merging comments is an issue since comments are stored according to their hash value. Note that in addition to the (text) value, attributes such as, for example, author and date are used in the computation of the hash value, C.

Figure 4:
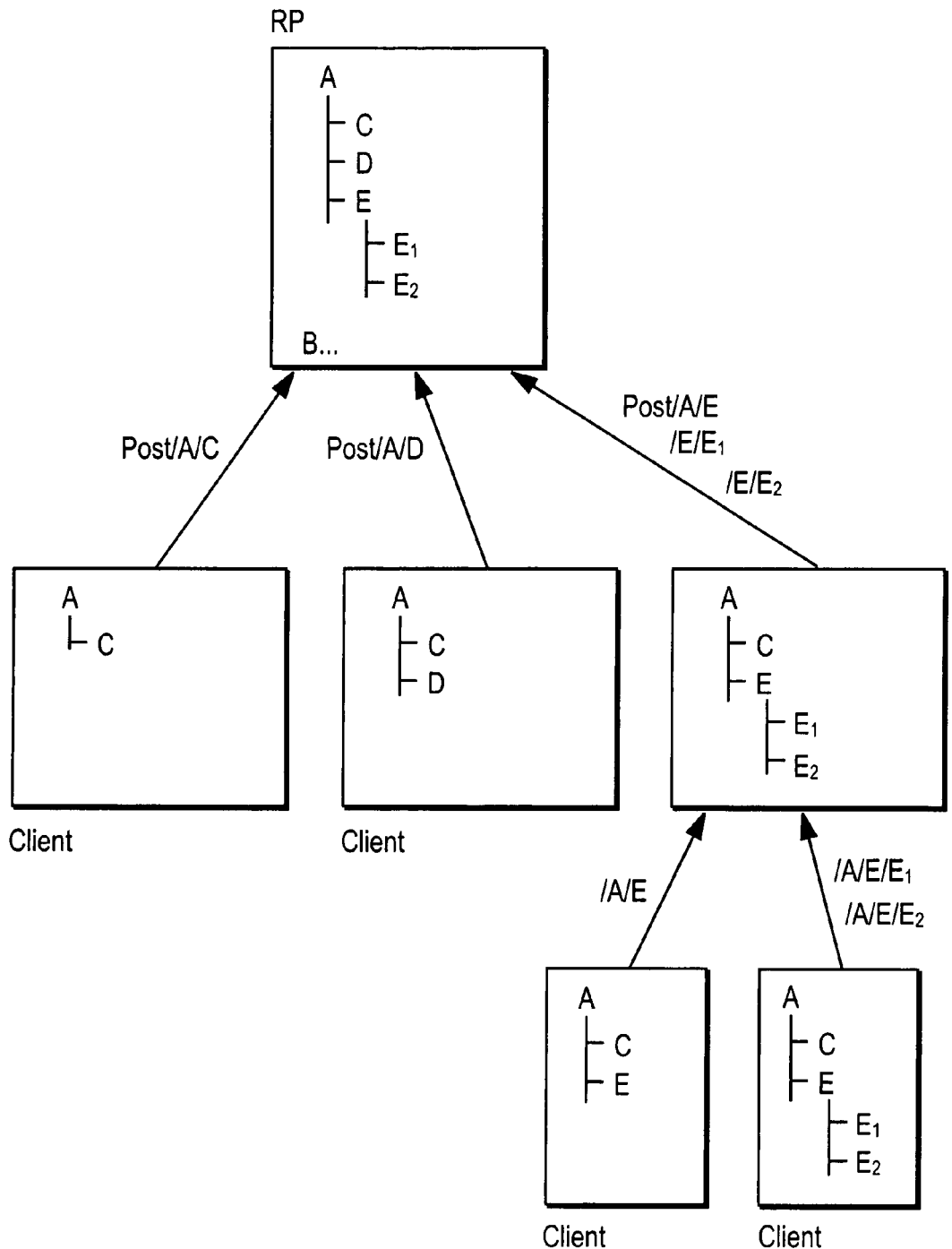
FIG. 4 is a diagram depicting the configuration of clients that submit entries to the rendezvous point for a particular document.

FIG. 4 is a diagram depicting the configuration of clients that submit entries to the rendezvous point for a particular document. Referring to FIG. 4, the overall diagram showing submission of entries from clients to the rendezvous point. Note that some clients may POST entries directly to the rendezvous point, while others may go through intermediary nodes. Since entries are referenced and stored by their hash values, any node can exchange entries directly with any other node without worry of a conflict. Individual nodes can also assign their own ordering to the sequence of entries. The ordering provided by the rendezvous point is, by convention, treated as the canonical ordering. Note that the original creator of a document might specify a rendezvous point or "root" for the log entries associated with that document by specifying the root or rp attribute of the initial idoc . . . ielement. Note however that a document log may be created by anyone, not necessarily just the creator of the document. (The creator of a document does have the first opportunity to register an initial log entry on the document.) Other nodes may or may not choose to use the root attributes specified in the document element. Document entries may be made while off-line and later automatically synchronize those entries with one or more servers.

The order of entries seen by the rendezvous point may differ from the actual creation order (especially if some clients are off-line at creation time). Also the intermediate nodes might aggregate entries from multiple other nodes and submit.

On the server side for the rendezvous point, in one embodiment, sequence numbers are assigned in the order in which they are received. Separate configuration and confirmation of user identity (e.g., posting authority) can be handled in any one of several ways. These include username and password verification, IP address testing, session identifiers, and the like. In some cases for encrypted content, the user might have to prove (through cryptographic methods) that they actually know the encryption key A (and/or the content a).

Rendezvous Points and Global Synchronization

As described, the arrangement of nodes above functions quite well for exchanging document logs in a decentralized, scalable, peer-to-peer arrangement. Comments can be made off-line or online and resolved through local exchanges.

However, a significant problem may arise when attempting to coordinate work between multiple clients. Many times those clients need to agree on an ordering or sequence of the entries. Because of simultaneous creation and communication lag times, it may not be possible to construct a unique ordering of those entries. Instead, each node may have its own unique ordering.

In one embodiment, a web service referred to herein as Rendezvous Point (RP.net) (RP.net is not an available domain name and used purely for example) provides a global ordering for any document log. In response to POST requests, such as, for example, POST(http://RP.net/A/C), RP.net assigns a sequence number to comment c in the context of document a. In response to a GET request, RP.net responds to GET(http://RP.net/A/) with a listing of known comments and specifies the sequence number for each comment.

In the same manner as servers other than the root domain name servers can provide DNS functions, in one embodiment, servers other than RP.net can provide sequence numbers. However, only one service can act as the cannonical service for assigning sequence numbers. In one embodiment, the authority is delegated to other services, but the responsibility remains with the RP.net organization.

Thus, server accepts metadata (e.g., a comment) and identifier which may be the hash or other valued related to a digital object (e.g., the document being commented on) and, in one embodiment, server assigns a sequence number to that metadata entry and publishes the updated list of sequence numbers and associated metadata entries. The server can publish either the entry content or identifiers calculated based on the content of the entries. Also, in one embodiment, the server digitally signs the published list.

Figure 5:
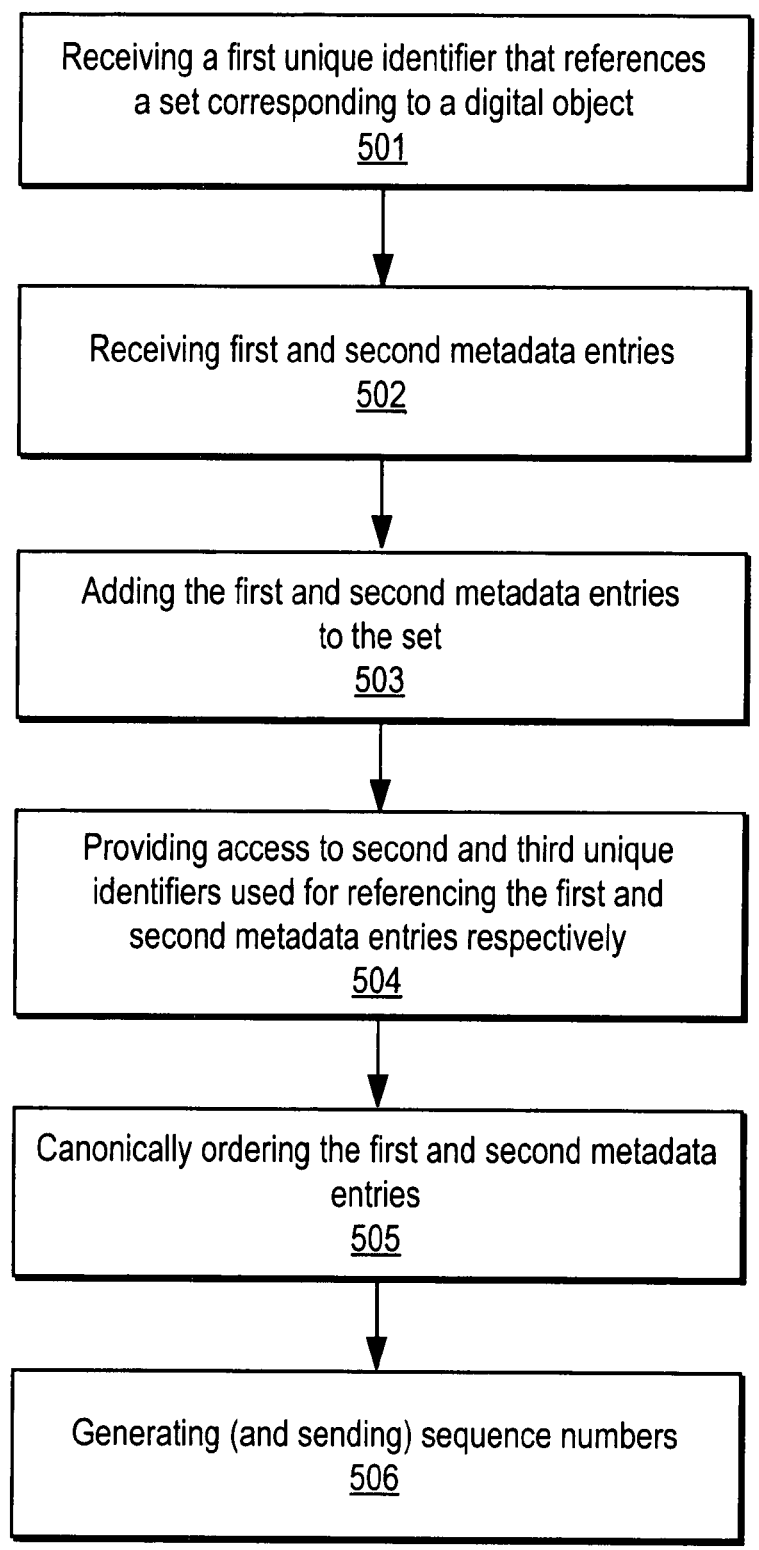
FIG. 5 is a flow diagram of one embodiment of a synchronization process.

FIG. 5 is a flow diagram of one embodiment of a synchronization process. The process is performed by processing logic that may comprise hardware (circuitry, dedicated logic, etc.), software (such as is run on a general purpose computer system or a dedicated machine), or a combination of both.

Referring to FIG. 5, the process begins by processing logic receiving a first unique identifier that references a set corresponding to a digital object (processing block 501). In one embodiment, the first unique identifier is computed based on content of the digital object. In one embodiment, the first unique identifier is a hash value that is a result of applying a hash function that maps an arbitrary sequence of bytes associated with the digital object into a fixed size sequence. Alternatively, the hash value is a result of applying a hash function on content of the digital object.

Note that the digital object may be indexed by the first unique identifier.

Processing logic also receives first and second metadata entries (processing block 502). Note that the sources of the first and second metadata entries may be different.

After receiving the first and second metadata entries, processing logic adds the first and second metadata entries to the set (processing block 503).

Once added, processing logic provides access to second and third unique identifiers used for referencing the first and second metadata entries respectively (processing block 504). The second and third unique identifiers are based on contents of the first and second metadata entries respectively. In one embodiment, the second and third unique identifiers are hash values. In one embodiment, the second and third unique identifiers are results of computing a hash value based on contents of the first and second metadata entries, respectively.

In one embodiment, providing access to the second and third unique identifiers comprises sending a canonical ordering of the second and third unique identifiers. In another embodiment, providing access to the second and third unique identifiers comprises sending sequence numbers associated the second and third unique identifiers, where each of the sequence numbers is associated with only one of the second and third unique identifiers. Note, instead of sending identifiers calculated based on the content, the content itself could be sent.

In one embodiment, the process further comprises canonically ordering the first and second metadata entries (processing block 505) and generating (and sending) sequence numbers (processing block 506) as described herein.

In one embodiment, the process further comprises accessing the first and second metadata entries using the first and second unique identifiers as indices. In one embodiment, the indices are hash values.

In one embodiment, the first metadata entry corresponds to a description of property for sale by a seller and the second metadata entry corresponds to an indication from a buyer expressing a commitment to purchase the property. In one embodiment, in such a case, the process of FIG. 5 further comprises receiving a third metadata entry containing information that references either or both of the first and second metadata entries. The process of FIG. 5 may also include receiving a third metadata entry (from source, or party, such as for example, an escrow agent, other than the ones providing the first and second metadata) containing information related to a transaction to purchase the property, including information such as, for example, shipping information (e.g., shipping dates, tracking numbers, and reception dates) and payment information.

In one embodiment, the process of FIG. 5 further includes access restriction processing to restrict the addition of additional metadata entries to the set of entries based on criteria (e.g. the number of metadata entries made on the document). In one embodiment, restricting access is performed by denying a request to add a further comment. In another embodiment, restricting access is performed by adding the second metadata entry to the set, charging a fee, and preventing publication of a sequence number associated with the second metadata entry when one or more other sequence numbers associated with one or more entries in the set are published until after receiving an indication that payment has been received. Such access restriction processing may further comprise publishing sequence numbers corresponding to entries in the set while preventing addition of further metadata entries. The access restriction processing is described in greater detail below.

In one embodiment, the process of FIG. 5 further includes some encryption processing. The encryption processing may include computing a hash of the digital object and encrypting one or both of the digital object and the second metadata entry using an encryption key that is a function of the content of the digital object. In one embodiment, the encryption key is a hash of the digital object. In an alternative embodiment, the encryption key is a function of an encrypted version of the digital object. In one embodiment, the encryption is performed using DES. In one embodiment, the encryption processing also includes creating the encrypted version of the digital object by applying the DES algorithm to the digital object using the hash of the digital object as the encryption key. The encryption processing is described in greater detail below.

Figure 6:
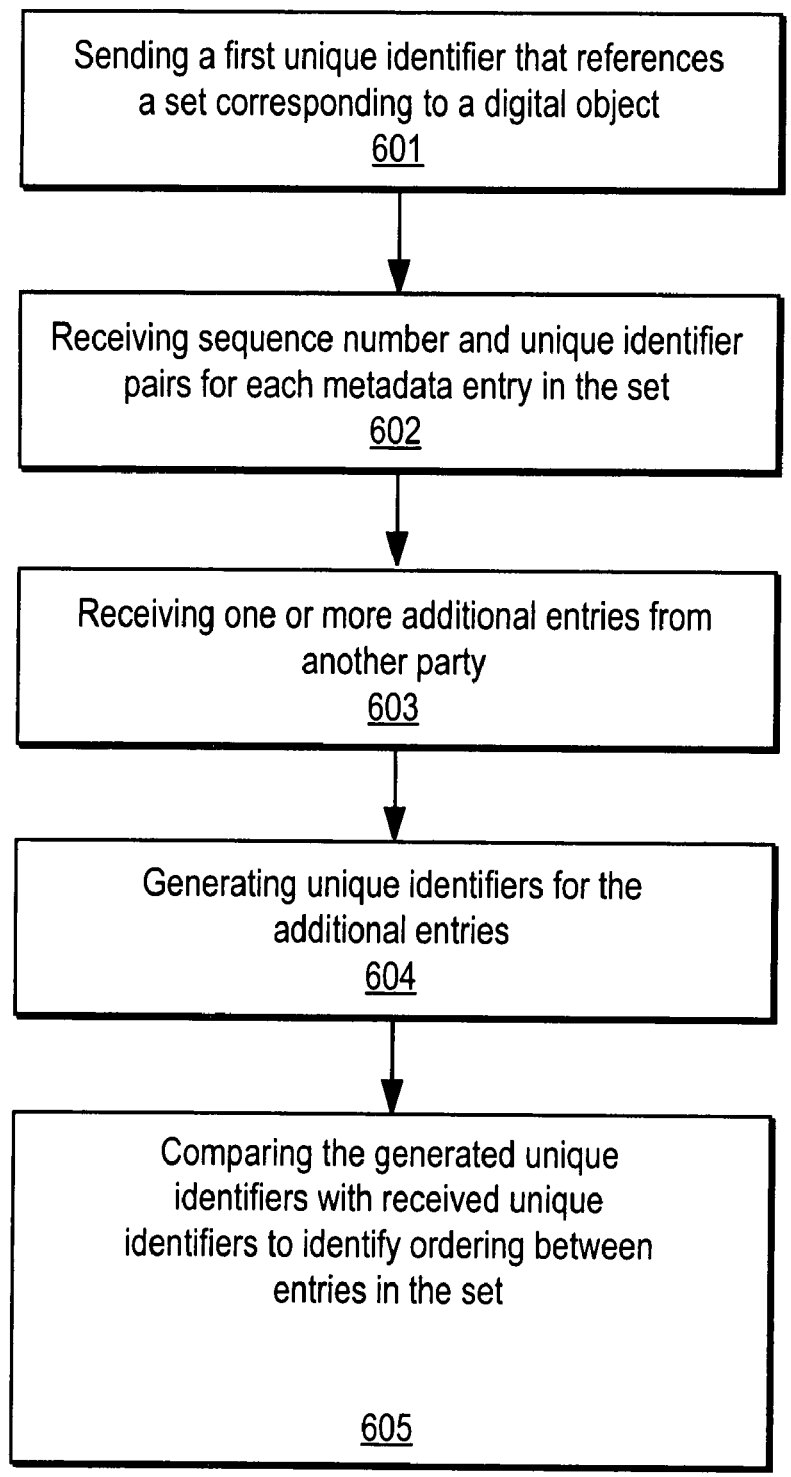
FIG. 6 is a flow diagram of one embodiment of a data process.

FIG. 6 is a flow diagram of one embodiment of a data process. The process is performed by processing logic that may comprise hardware (circuitry, dedicated logic, etc.), software (such as is run on a general purpose computer system or a dedicated machine), or a combination of both.

Referring to FIG. 6, the process begins by processing logic sending a first unique identifier that references a set corresponding to a digital object (processing block 601). Processing logic then receives sequence number and unique identifier pairs for each metadata entry in the set (processing block 602). In one embodiment, the unique identifier in the pair is a hash value.

In one embodiment, the process further comprises receiving one or more additional entries from another party (processing block 603), generating unique identifiers for the additional entries (processing block 604), and comparing the generated unique identifiers with received unique identifiers to identify an order between the one or more additional entries and other entries in the set (processing block 605).

In one embodiment, the process may further include identifying a temporal location of the first unique identifier among unique identifiers in the set.

Business Models

Tying the log entries to particular document contents presents the possibility for new transactional business models. Each identifier corresponds to a space. The server may charge individual users to accept and publish their updated entries. For example, assume an initial identifier and some number, N, of entries are paid for by user A. After the nth entry, in one embodiment, the sequence is locked until payment is received (the sequence list is still published, but no updates are possible). If user B attempts to register an entry, the server denies the request (or does not publish the assigned sequence number) until additional payment is received (either from A, B, or other interested parties).

In particular, RP.net might charge on a per "document space" basis to accept new comments and assign them to that space. For example, RP.net might charge a at rate (say zero) for the first 100 registered comments. After that, additional registrations might cost some small amount. This amount could be paid by the document owner (e.g., the person who added the first entry) or by the comment submitter (the person or organization wishing to add the comment) or other interested parties.

In a typical scenario, the original submitter might wish to start a discussion, for instance about a particular photo of a birthday party. They send a photo around to their friends and pay RP.net for the first 100 comments. Eventually they may lose interest and no longer wish to underwrite that discussion. Some other person, for instance, the parent of the child having the birthday, might wish to continue the discussion, perhaps something as simple as adding in a link to their own photo album. The parent could then pay for and register the 101st comment. Of course, the parent might also just want to enable other people, such as the grandparents, to continue making comments and pay for another block (e.g., 100) of comment registrations.

In one embodiment, RP.net makes available the currently registered comments at no fee. (The fees paid for the initial comments provide, in essence, an ongoing obligation to provide the sequence numbers and possibly the common contents.) This has the desired effect of making the existing comments visible and generating demand for people who see those comments to add (and pay for) their own. Coupled with the encryption techniques described herein, this service and business model works equally well with public documents and comments as well as private documents and private comments. (There can even be public comments on private documents and vice versa all without having to trust RP.net with any private information.)

Many additional variations on this model are possible. The most obvious are restricting registration access on a per document and per user/organization basis. (For example, the initial comment in a document log might be information that limits the posting access to a set of identified users, or such configuration information can be handled outside of the document log mechanism itself.)

Figure 7:
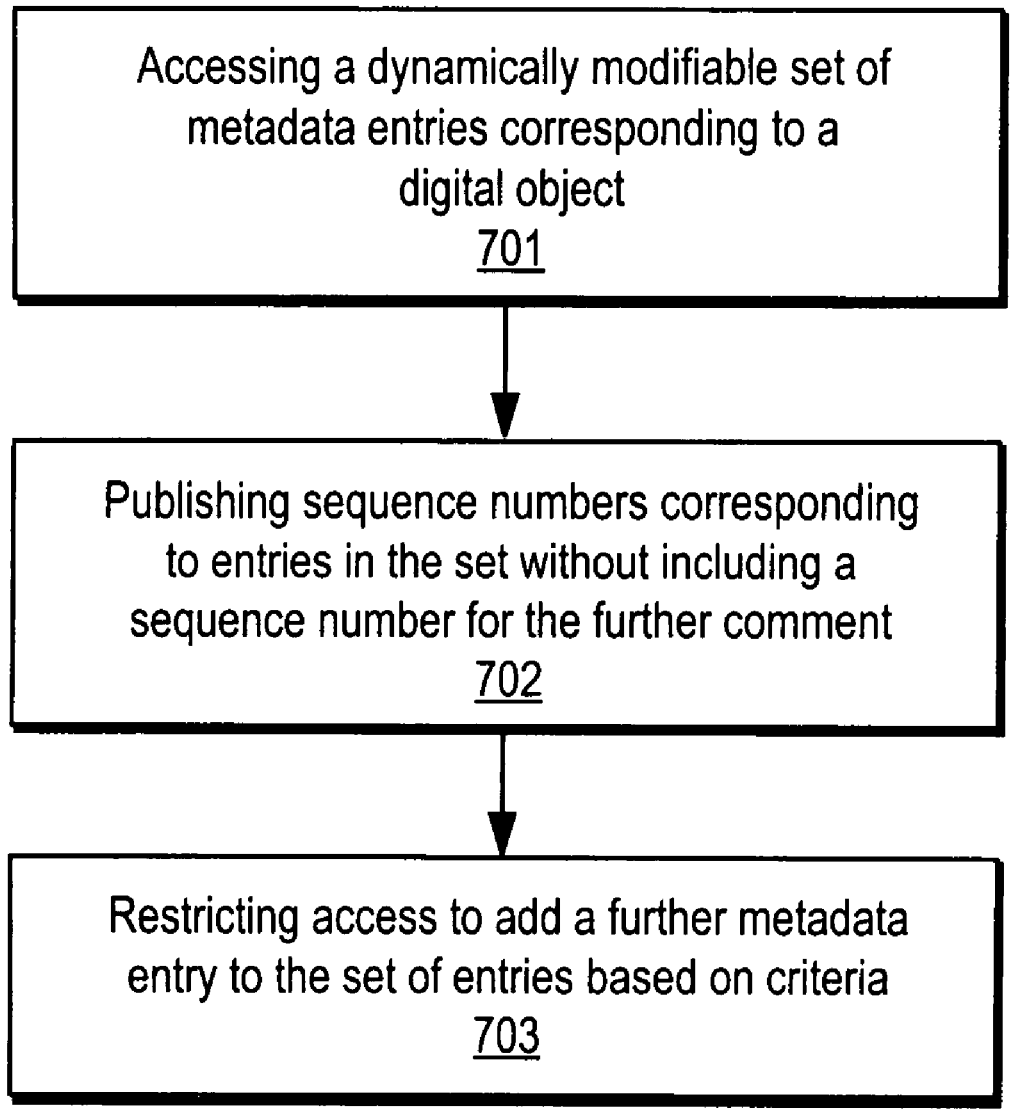
FIG. 7 is a flow diagram of one embodiment of an access process.

FIG. 7 is a flow diagram of one embodiment of an access process. The process is performed by processing logic that may comprise hardware (circuitry, dedicated logic, etc.), software (such as is run on a general purpose computer system or a dedicated machine), or a combination of both.

Referring to FIG. 7, the process begins by processing logic accessing a dynamically modifiable set of metadata entries corresponding to a digital object (processing block 701). The set of metadata entries comprises first and second metadata entries.

In one embodiment, the process includes processing logic publishing sequence numbers corresponding to entries in the set without including a sequence number for the further comment (processing block 702). Note that this is not a requirement.

After accessing the set of metadata entries, processing logic restricts access to add a further metadata entry to the set of entries based on criteria (processing block 703). Restricting access may comprise not accepting the second metadata entry until some criteria is met or may comprise denying a request to add a further comment.

In one embodiment, the criterion comprises the number of metadata entries made on the document. In another embodiment, the criterion comprises the time at which the further metadata entry is to be made.

In one embodiment, restricting access includes adding the second metadata entry to the set, charging a fee, and preventing publication of a sequence number associated with the second metadata entry when one or more other sequence numbers associated with one or more entries in the set are published until after receiving an indication that payment has been received.

In one embodiment, restricting access may include charging for access and permitting access after receiving an indication that payment has been received from a party.

Flash Clients

Examples given in FIGS. 1 and 2 use Macromedia flash as the platform for the user interface client. Flash has the advantage of being extremely portable (available on a very large number of platforms), includes dynamic capabilities (for example zooming in on entries in a large list), and natively displaying a large number of document types (including not only text and images, but also video, audio, and "flash" paper.)

Flash players also have the advantage of running inside of browsers and maintaining local caches which are segmented from the local filesystem. The caches enable smooth online and offline operation, including the ability to add document entries while off-line and later automatically synchronize those entries with one or more servers. Many other clients are possible, including, for example, standard HTML with or without dynamic scripts such as, for example, JavaScript.

Encrypted Documents

One variation of document logs is to use one level of indirection in referencing the contents of a. Instead of using A=SHA1(a) as the origin for the document log about a, use AA=SHA1(ENC(a, A)), where A=SHA1(a) is used as an encryption key to encode a. ENC is an encryption algorithm, for example, DES. A can also be used as an encryption key to encode "secret and use A as an encryption key for a and secret comments c. The virtual protocol is defined herein DES://A/AC which refers to c where AC is the hash of encrypted version of c using key A in the application of the DES algorithm. (Similar notation can be used for RSA and other algorithms.) Therefore, GET(SHA1:///AA/) returns the encrypted version of A represented by DES://A/AA. GET(DES://A/AA) returns a—but can only be calculated if the client already knows A. Most often, the client obtains A by first obtaining a and then calculating A.

In the case the client obtains a from another channel (e.g., they created the document or received it as an attachment by e-mail) and never has a need to actually decrypt the encrypted version of A. However, they can and do use A to encrypt and decrypt comments associated with a. While a plain text comment on A could still be stored locally as SHA1:///A/C, the client would not want to exchange these comments directly with any other node (the client should not reveal A to other, potentially unauthorized, nodes.) Instead, the client exchanges SHA1:///AA/C. In other words, clients use and exchange comments on the hash of the encrypted version of a (using A as the encryption key). Secret comments can also be used by using AC (the hash at the encrypted version of c using A as the encryption key) for the comment "locations."

In this way, two parties that share the same object (e.g., anything from a jpg file that they exchanged as an e-mail attachment, to a secret passphrase that they communicated face to face) can communicate securely about that object through completely untrusted third parties.

Figure 8:
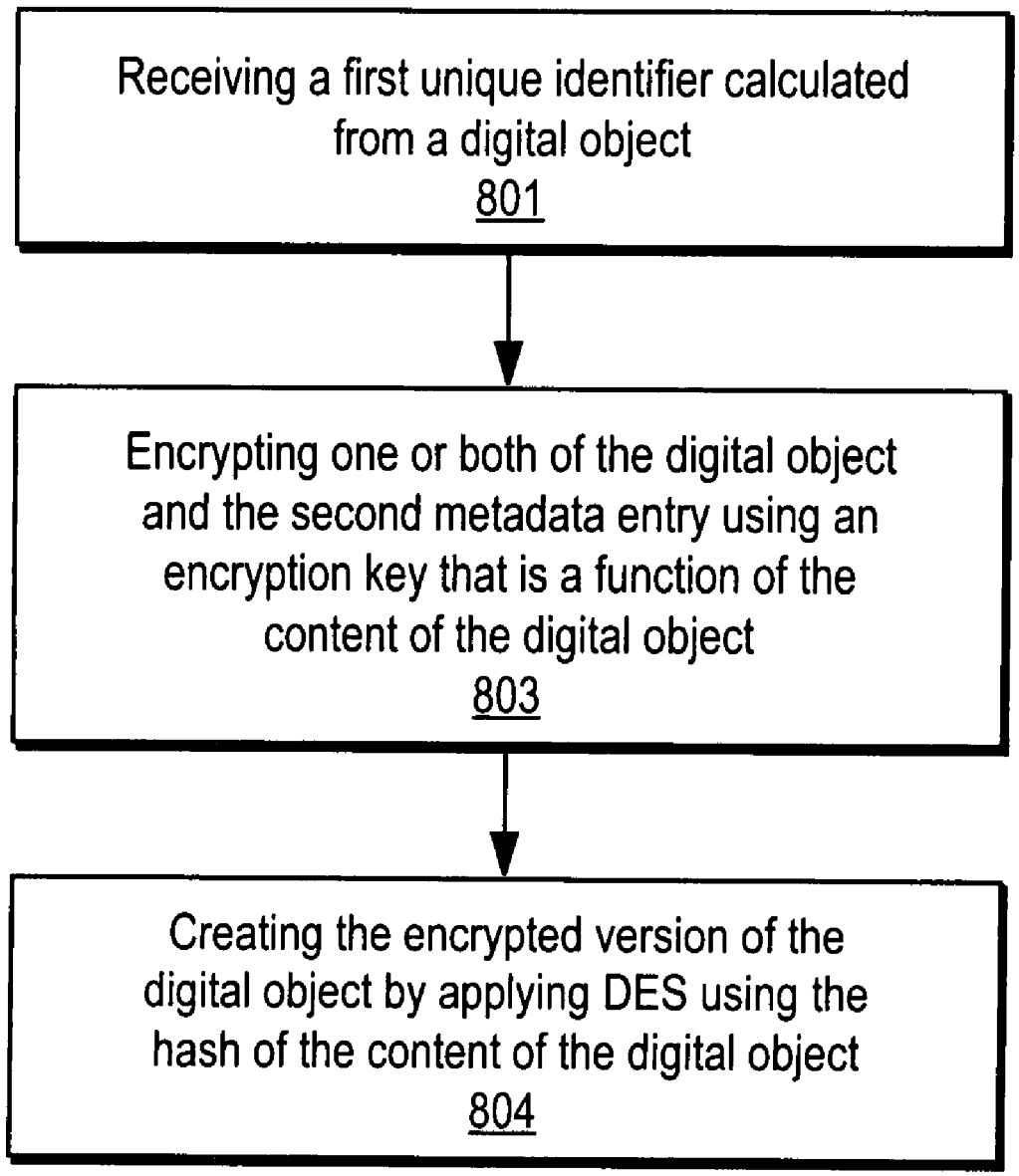
FIG. 8 is a flow diagram of one embodiment of an encryption process.

FIG. 8 is a flow diagram of one embodiment of an encryption process. The process is performed by processing logic that may comprise hardware (circuitry, dedicated logic, etc.), software (such as is run on a general purpose computer system or a dedicated machine), or a combination of both.

Referring to FIG. 8, the process begins by processing logic receiving a first unique identifier calculated from a digital object (processing block 801). The set has at least first and second metadata entries.

Using the identifier of the digital object, processing logic encrypts at least one of the digital object, the first metadata entry, and the second metadata entry using an encryption key that is a function of the content of the digital object (processing block 803). In one embodiment, the encryption key is a hash of the digital object. In one embodiment, the encryption key is a function of an encrypted version of the digital object. In one embodiment, encrypting one or both of the digital object and the second metadata entry is performed using DES.

In one embodiment, the process also includes processing logic creating the encrypted version of the digital object by applying DES using the hash of the digital object as the encryption key (processing block 804).

In another embodiment, the encryption process may include maintaining a dynamically modifiable set of one or more entries corresponding to a digital object, wherein maintaining the dynamically modifiable log by computing an identifier (e.g., a hash value) based on the content of the digital object and performing encryption using the identifier as the encryption key. Performing encryption using the identifier as the encryption key may include encrypting the digital object with the identifier. In an alternative embodiment, performing encryption using the identifier as the encryption key comprises encrypting the hash of the digital object with the identifier.

In one embodiment, the identifier is a hash value computed by applying a hash function to the content of the digital object and performing encrypting comprises encrypting the digital object using DES with the hash value as an encryption key. Such a process may also include generating the hash of the encrypted digital object and using the hash as an index to access the digital object or encrypting content of an entry using the identifier. In one embodiment, the identifier is the hash of the digital object.

Entanglement

The techniques described herein may be used to make the forgery of entries into a document log arbitrarily difficult. In one embodiment, synchronizing server SA adds a comment x to the log of a, SHA1:/SA/A/E. The log of a is begun with a verification hash VA, which can only be produced by knowing a secret qa held by SA. For example, the seed might be constructed by taking the MD5 hash of the contents of document a concatenated with secret q. This seed value VA1 is noted in the log of a, as the first entry. When comment x is added to the log of a, a verification hash VA2 is created by appending VA and hash X of the comment x, and taking the MD5 hash of the resulting string. Similarly, for the next comment y, a verification hash value VA3 can be created by appending VA2 and hash Y of the comment y and taking the hash of the resulting concatenated string (e.g., VA3=MD5 (VA2 & SHA1(y)). It can be seen that each entry will verify that it has been appended in a specific order, and that no entries have been omitted. Any examining authority can verify that a particular log is valid and in the correct sequence order. Additional security can be provided by digitally signing each verification hash, using a public/private key pair held by server SA.

It is clear that such logs themselves can be rewritten from the beginning by computing new hashes. However, logs that are verifiable in this way can be entangled, which is to say that the logs can refer to the state of one another in entries. Consider a second document log B, associated to document b, whose synchronizing server is SB. As entries are added to B, they are also validated with the sequential hashing mechanism noted immediately above. When an entry in B refers to document a, it can include the last entry of log A, including the verification hash VA2. This entangles the two logs.

Now, should an attacker wish to replace or remove an entry in log SHA1:/SA/A, he must know of the existence of log SHA1:/SB/B and replace that log as well. Since no reference to log SHA1:/SB/B can be found in log SHA1:/SA/A, it is arbitrarily difficult to make an undetectable modification to log A. With only a small number of cross-references between document logs, it becomes effectively impossible to find and replace all log entries that may refer to a given log. Furthermore, a malicious server cannot create a malicious log entry in its own logs, disagreeing with a valid verification hash, because such entries would not have the correct digital signature.

Figure 9:
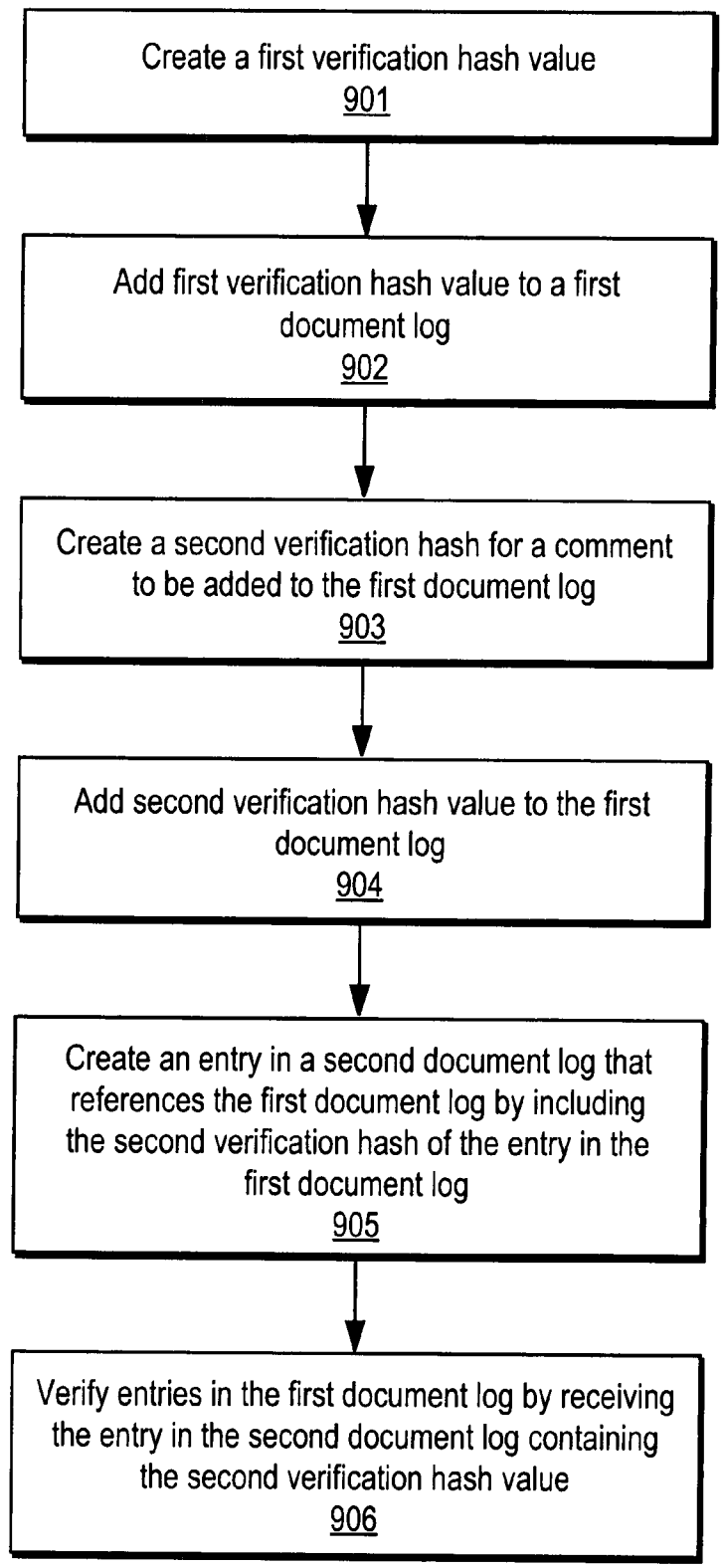
FIG. 9 is a flow diagram of one embodiment of an entanglement process.

FIG. 9 is a flow diagram of one embodiment of an entanglement process. The process is performed by processing logic that may comprise hardware (circuitry, dedicated logic, etc.), software (such as is run on a general purpose computer system or a dedicated machine), or a combination of both.

Referring to FIG. 9, the process begins by creating a first verification hash value (processing block 901). In one embodiment, the first verification hash value is created by computing the hash value of a string that results from concatenating a secret q with the contents of a document a. In one embodiment, the document a corresponds to the document for the document log.

Once the first verification hash has been created, processing logic adds the first verification hash to the first document log (processing block 902).

Subsequently, processing logic creates a second verification hash value for a comment to be added to the first document log (processing block 903). In one embodiment, the second verification hash value is created by computing the hash value of a string that results from concatenating the first verification hash value with a hash of the comment to be added.

After creating the second verification hash value, processing logic adds the second verification hash value to the first document log (processing block 904).

Thereafter, processing logic creates an entry in a second document log that references the first document log by including the second verification hash value of an entry in the first document log (processing block 905).

At some time later, processing logic verifies entries in the first document log by accessing the entry in the second document log that contains the second verification hash value (processing block 906).

Hash-Based Searching

Hash-based searching may be performed using the techniques described herein. Given SH A1 : //host.com/A/B a node which does not yet have content b may wish to search for b. As mentioned in the text, the node may search in local tables or by requesting information from other servers (e.g., host.com or generic search servers). The servers in turn may send out additional request to yet other servers. While most search engines rely on content (e.g., key words) or identifiers (e.g., filenames), few provide the ability to search by hash value. Of those that do, they generally offer a simple global search capability. Systems such as Freenet provide federated searches based on hash values, where client requests to server S are forwarded to additional servers S' depending on the configuration of S. In contrast, we can use the context, A and host.com as additional factors in limiting and/or directing the search. As one example, consider the case in which the server S requires that the client demonstrate knowledge of a before performing a search or returning the results of the search for B. Note the client might have to sign the request for B using a where the signature consists of calculating the hash value of a concatenated with the string representing the request for B and supplying that hash value to the server.

Figure 10:
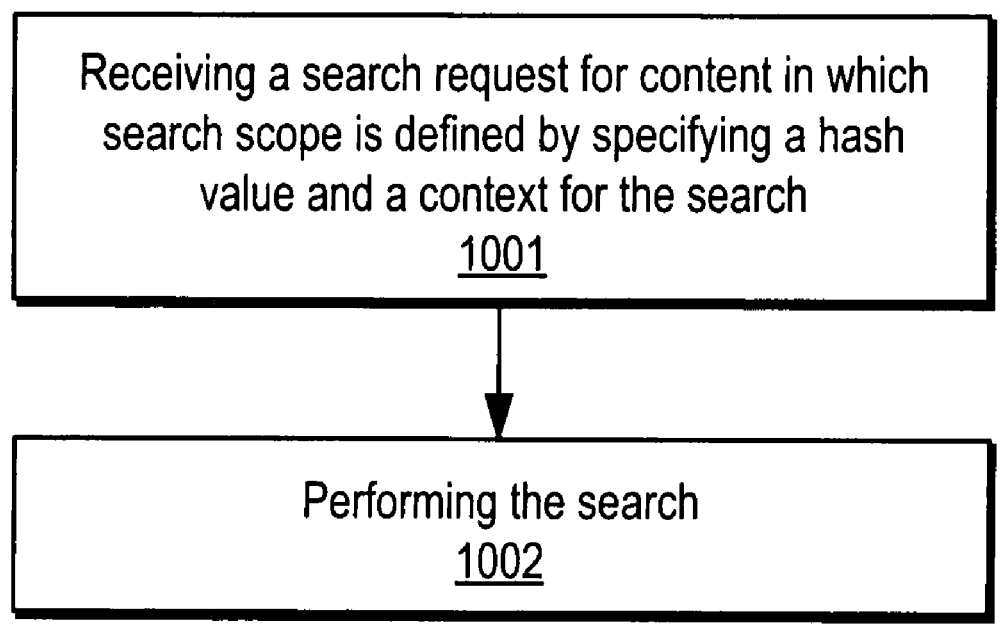
FIG. 10 is a flow diagram of one embodiment of a hash-based searching process.

FIG. 10 is a flow diagram of one embodiment of a hash-based searching process. The process is performed by processing logic that may comprise hardware (circuitry, dedicated logic, etc.), software (such as is run on a general purpose computer system or a dedicated machine), or a combination of both. Referring to FIG. 10, the process begins by processing logic receiving a search request for content in which search scope is defined by specifying a hash value and a context for the search (processing block 1001). Then processing logic performs the search (processing block 1002).

Use in Transaction Systems

This sequence operation is a fundamental building block for managing distributed work. As such, there are many potential usage scenarios. Many such scenarios revolve around transactions, such as the auction of an item. In a simplified case the seller of an object puts a comment into the log for that object, the buyer places a comment expressing a commitment to buy, one or more third parties place comments about the transaction, such as shipping dates, tracking numbers, reception dates, and payment information. Some of these third parties might act as escrow agents, e.g. only placing comments once an "official sequence" number for prior comments has been assigned by the synchronizing service (e.g., the payment service may not publish a comment finalizing payment until it sees a sequenced comment that the delivery has been received). At any point during the process, any involved party can see the current list of comments (as well as their own "pending" comments which have not yet been sequenced). The synchronizing service enables this type of transaction without each party having to negotiate separately with the other parties beforehand. This greatly reducing the overhead and administration and integration costs while providing more flexibility and visibility than current systems.

Figure 11:
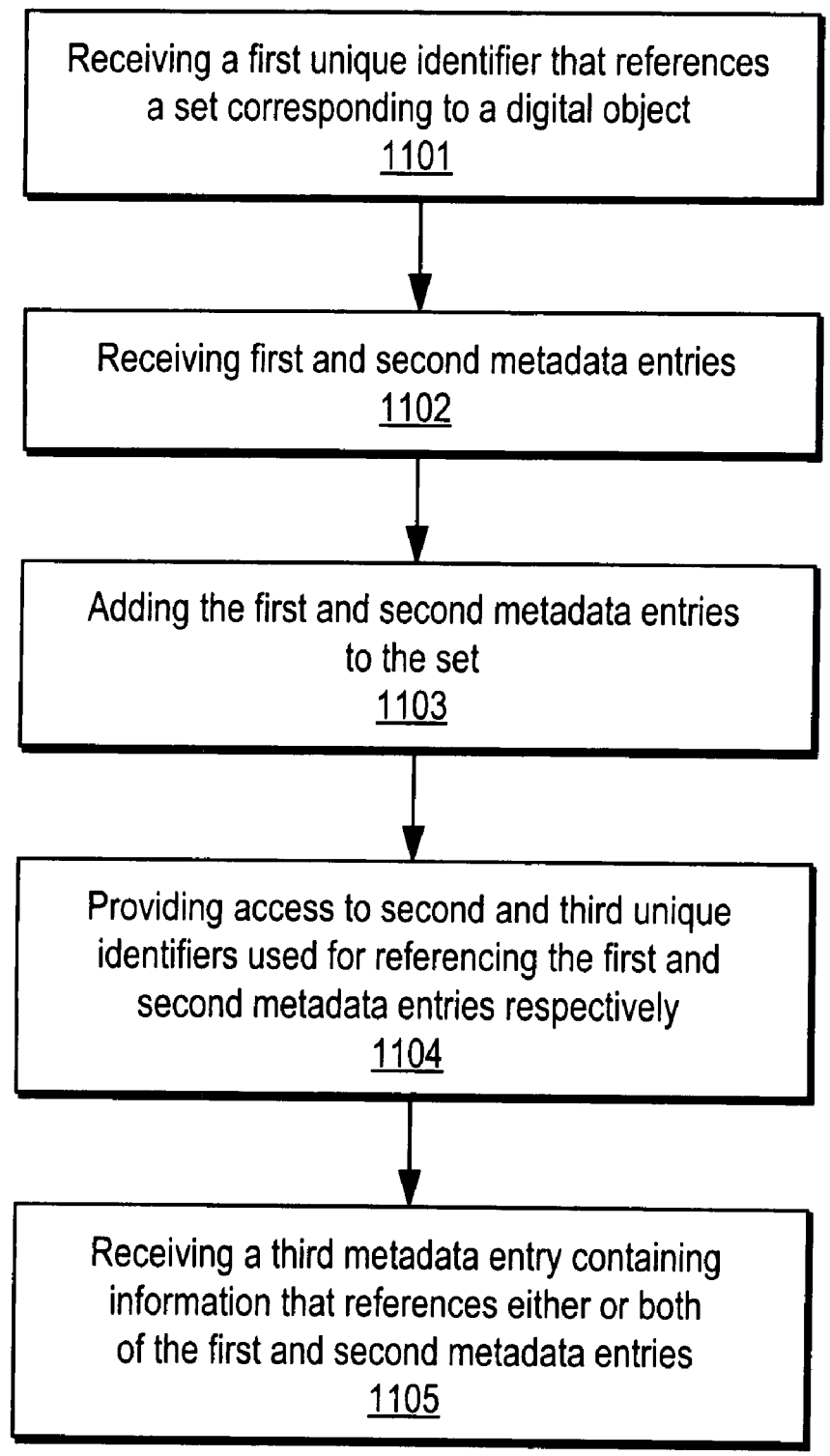
FIG. 11 is a flow diagram of one embodiment of a transaction process.

FIG. 11 is a flow diagram of one embodiment of a transaction process. The process is performed by processing logic that may comprise hardware (circuitry, dedicated logic, etc.), software (such as is run on a general purpose computer system or a dedicated machine), or a combination of both.

Referring to FIG. 11, the process begins by processing logic receiving a first unique identifier that references a set corresponding to a digital object (processing block 1101).

Next, processing logic receives first and second metadata entries (processing block 1102). The first metadata entry corresponds to a description of property for sale by a seller and the second metadata entry is designed to obtain additional information about the first metadata entry. In one embodiment, the additional information comprises a sequence number corresponding to the first metadata entry. In another embodiment, the first metadata entry corresponds to a description of property for sale by a seller and the second metadata entry corresponds to an indication from a buyer expressing a commitment to purchase the property.

After being received, processing logic adds the first and second metadata entries to the set (processing block 1103).

Once added to the set, processing logic provides access to second and third unique identifiers used for referencing the first and second metadata entries respectively (processing block 1104). The second and third unique identifiers are based on contents of the first and second metadata entries respectively.

In one embodiment, the process also includes processing logic receiving a third metadata entry containing information that references either or both of the first and second metadata entries (processing block 1105). In one embodiment, the third metadata entry is from another party that is not a source for the first and second metadata entries. Such a party may be, for example, an escrow agent. The third metadata entry may contain information related to a transaction to purchase the property, including shipping information (e.g., shipping dates, tracking numbers, and reception dates) and payment information. In one embodiment, the third party metadata entry is added only after a sequence number for one or more prior metadata entries has been assigned.

An Exemplary Computer System

Figure 12:
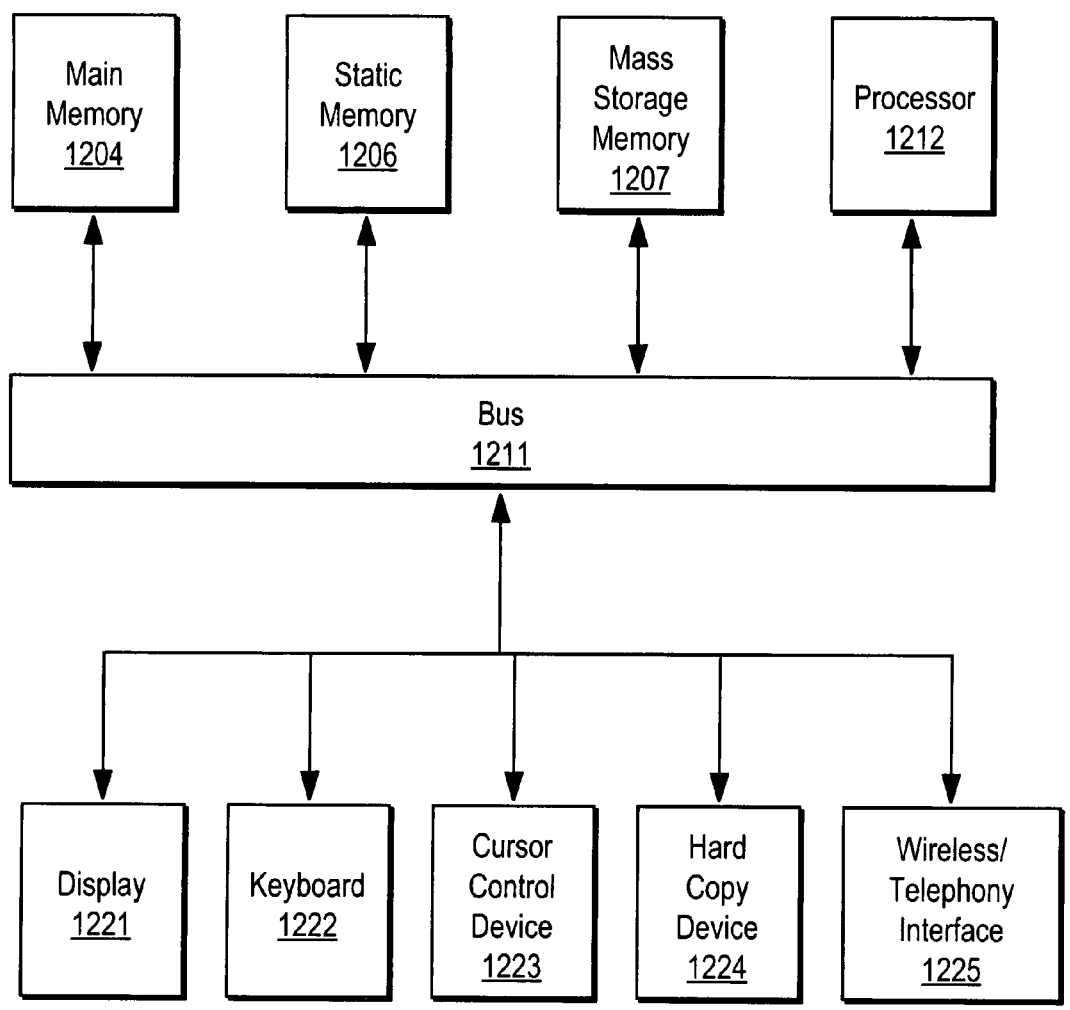
FIG. 12 is a block diagram of an exemplary computer system.

FIG. 12 is a block diagram of an exemplary computer system that may perform one or more of the operations described herein. Referring to FIG. 12, computer system 1200 may comprise an exemplary client 1250 or server 1200 computer system. Computer system 1200 comprises a communication mechanism or bus 1211 for communicating information, and a processor 1212 coupled with bus 1211 for processing information. Processor 1212 includes a microprocessor, but is not limited to a microprocessor, such as, for example, Pentium™, etc.

System 1200 further comprises a random access memory (RAM), or other dynamic storage device 104 (referred to as main memory) coupled to bus 1211 for storing information and instructions to be executed by processor 1212. Main memory 1204 also may be used for storing temporary variables or other intermediate information during execution of instructions by processor 1212.

Computer system 1200 also comprises a read only memory (ROM) and/or other static storage device 1206 coupled to bus 1211 for storing static information and instructions for processor 1212, and a data storage device 1207, such as a magnetic disk or optical disk and its corresponding disk drive. Data storage device 1207 is coupled to bus 1211 for storing information and instructions.

Computer system 1200 may further be coupled to a display device 1221, such as a cathode ray tube (CRT) or liquid crystal display (LCD), coupled to bus 1211 for displaying information to a computer user. An alphanumeric input device 1222, including alphanumeric and other keys, may also be coupled to bus 1211 for communicating information and command selections to processor 1212. An additional user input device is cursor control 1223, such as a mouse, trackball, trackpad, stylus, or cursor direction keys, coupled to bus 1211 for communicating direction information and command selections to processor 1212, and for controlling cursor movement on display 1221.

Another device that may be coupled to bus 1211 is hard copy device 1224, which may be used for printing instructions, data, or other information on a medium such as film, or similar types of media. Furthermore, a sound recording and playback device, such as a speaker and/or microphone may optionally be coupled to bus 1211 for audio interfacing with computer system 1200. Another device that may be coupled to bus 1211 is a wired/wireless communication capability 1225 to communication to a phone or handheld palm device.

Note that any or all of the components of system 1200 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims that in themselves recite only those features regarded as essential to the invention.

We claim:

1. A method comprising:
receiving first and second metadata entries;
adding the first and second metadata entries to a set corresponding to a digital object;
providing access to first and second unique identifiers, the first and second unique identifiers referencing the first and second metadata entries respectively, the first and second unique identifiers are hash values resulting from applying, by a computer processor, a function to contents of the first and second metadata entries respectively, wherein an order of the first and second metadata entries in the set is established by an order of the first and second unique identifiers;
accessing the first and second metadata entries using the first and second unique identifiers as indices;
receiving a third unique identifier that references the set, wherein the third unique identifier corresponding to the digital object comprises a hash value that is a result of applying a hash function that maps an arbitrary sequence of bytes associated with the digital object into a fixed size sequence;
computing a hash of the digital object;
encrypting at least one of the digital object, the first metadata entry, and the second metadata entry using an encryption key that is a function of the content of the digital object, wherein the encryption key is a function of an encrypted version of the digital object; and
creating the encrypted version of the digital object by applying a hash function to the content of the digital object.

2. The method defined in claim 1 wherein the first and second unique identifiers are results of computing a hash value based on contents of the first and second metadata entries, respectively.

3. The method defined in claim 1 wherein sources of the first and second metadata entries are different.

4. The method defined in claim 1 wherein the indices are hash values.

5. The method defined in claim 1 wherein the third unique identifier is computed based on content of the digital object.

6. The method defined in claim 1 wherein the hash value is a result of applying a hash function on content of the digital object.

7. The method defined in claim 1 wherein the digital object is indexed by the third unique identifier.

8. The method defined in claim 1 further comprising canonically ordering the first and second metadata entries.

9. The method defined in claim 1 wherein providing access to the first and second unique identifiers comprises sending a canonical ordering of the first and second unique identifiers.

10. The method defined in claim 1 wherein providing access to the first and second unique identifiers comprises sending sequence numbers associated with the first and second unique identifiers, wherein each of the sequence numbers is associated with only one of the first and second unique identifiers.

11. The method defined in claim 1 further comprising assigning a distinct sequence number to each entry in the set including the first and second metadata entries.

12. The method defined in claim 11 further comprising sending, in response to a request, the distinct sequence number for each entry in the set including the first and second metadata entries along with unique identifiers associated with said each entry.

13. The method defined in claim 12 wherein sending sequence numbers occurs in response to a GET request.

14. The method defined in claim 11 wherein each distinct sequence number is assigned to the first and second metadata entries according to an order in which the first and second metadata entries are received.

15. The method defined in claim 11 wherein each distinct sequence number is assigned to each of the first and second metadata entries independent of an order in which the first and second metadata entries are created.

16. The method defined in claim 1 wherein the first metadata entry corresponds to a description of a transaction and the second metadata entry obtains additional information about the first metadata entry.

17. The method defined in claim 16 wherein the description of the transaction includes an identification of property for sale by a seller.

18. The method defined in claim 16 wherein the additional information comprises a sequence number corresponding to the first metadata entry.

19. The method defined in claim 1 wherein the first metadata entry corresponds to a description of property for sale by a seller and the second metadata entry corresponds to an indication from a buyer expressing a commitment to purchase the property.

20. The method defined in claim 19 further comprising receiving a third metadata entry containing information that references either or both of the first and second metadata entries.

21. The method defined in claim 19 further comprising receiving a third metadata entry containing information related to a transaction to purchase the property, including information selected from a group consisting of: shipping information and payment information.

22. The method defined in claim 19 wherein the shipping information includes one or more selected from the group of shipping dates, tracking numbers, and reception dates.

23. The method defined in claim 19 further comprising receiving a third metadata entry from another party that is not a source for the first and second metadata entries.

24. The method defined in claim 23 wherein the another party comprises an escrow agent.

25. The method defined in claim 23 wherein the third party metadata entry is added only after a sequence number for one or more prior metadata entries has been assigned.

26. The method defined in claim 1 further comprising performing a consistency check to ensure the content is equal to the hash value.

27. The method defined in claim 1 further comprises sending an updated set of entries each time a user views the digital object.

28. The method defined in claim 1 further comprising restricting access to add a further metadata entry to the set of entries based on criteria.

29. The method defined in claim 28 wherein restricting access to add the further metadata entry comprises denying a request to add the further metadata entry.

30. The method defined in claim 28 further comprising publishing sequence numbers corresponding to entries in the set while preventing addition of further metadata entries.

31. The method defined in claim 28 wherein restricting access comprises:
adding the second metadata entry to the set;
charging a fee; and
preventing publication of a sequence number associated with the second metadata entry when one or more other sequence numbers associated with one or more entries in the set are published until after receiving an indication that payment has been received.

32. The method defined in claim 28 wherein the criteria comprise the number of metadata entries made to the set.

33. The method defined in claim 28 wherein the criteria comprise a time at which the further metadata entry is to be made.

34. The method defined in Claim 1 wherein the encryption key is a hash of the digital object.

35. The method defined in claim 34 wherein encrypting at least one of the digital object, the first metadata entry, and the second metadata entry is performed using DES (Data Encryption Standard) with the hash as an encryption key.

36. The method defined in claim 1 wherein receiving first and second metadata entries comprises responding to an HTTP (Hypertext Transfer Protocol) POST request that includes at least one of the first and second metadata entries.

37. The method defined in claim 1 further comprising sending the set including the digital object.

38. The method defined in claim 37 wherein sending the set with the digital object occurs in response to receiving an HTTP (Hypertext Transfer Protocol) GET request.

39. The method defined in claim 1 wherein making identifiers associated with the first and second metadata entries available in response to receiving a transaction fee.

40. The method defined in claim 1 wherein the digital object comprises a plurality of bytes.

41. The method defined in claim 1 wherein at least one of the first and second metadata entries comprises a message.

42. The method defined in claim 41 wherein the message comprises a text message.

43. The method defined in claim 1 wherein the second metadata entry comprises a link.

44. The method defined in claim 1 wherein the set is in XML (Extensible Markup Language) format.

45. The method defined in claim 1 wherein the set comprises a log.

46. The method defined in claim 1 wherein the digital object is an identifier string.

47. An article of manufacture having one or more non-transitory machine readable storage medium storing instructions which, when executed by a computer, cause the computer to perform a method comprising:
receiving first and second metadata entries;
adding the first and second metadata entries to a set corresponding to a digital object; and
providing access to first and second unique identifiers, the first and second unique identifiers referencing the first and second metadata entries respectively, the first and second unique identifiers are hash values resulting from applying a function to contents of the first and second metadata entries respectively, wherein an order of the first and second metadata entries in the set is established by an order of the first and second unique identifiers; and
accessing the first and second metadata entries using the first and second unique identifiers as indices;
receiving a third unique identifier that references the set, wherein the third unique identifier corresponding to the digital object comprises a hash value that is a result of applying a hash function that maps an arbitrary sequence of bytes associated with the digital object into a fixed size sequence;
computing a hash of the digital object;
encrypting at least one of the digital object, the first metadata entry, and the second metadata entry using an encryption key that is a function of the content of the digital object, wherein the encryption key is a function of an encrypted version of the digital object; and
creating the encrypted version of the digital object by applying a hash function to the content of the digital object.

48. The article of manufacture defined in claim 47 wherein the first and second unique identifiers are results of computing a hash value based on contents of the first and second metadata entries, respectively.

49. The article of manufacture defined in claim 47 wherein the method further comprises canonically ordering the first and second metadata entries.

50. The article of manufacture defined in claim 47 wherein the method further comprises sending, in response to a request, a distinct sequence number for each entry in the set including the first and second metadata entries along with unique identifiers associated with said each entry.

51. The article of manufacture defined in claim 47 wherein the first metadata entry corresponds to a description of a transaction and the second metadata entry obtains additional information about the first metadata entry.

52. The article of manufacture defined in claim 51 wherein the description of the transaction includes an identification of property for sale by a seller.

53. The article of manufacture defined in claim 47 wherein the first metadata entry corresponds to a description of property for sale by a seller and the second metadata entry corresponds to an indication from a buyer expressing a commitment to purchase the property.

54. The article of manufacture defined in claim 47 wherein the method further comprises restricting access to add a further metadata entry to the set of entries based on criteria.

55. The article of manufacture defined in claim 54 wherein restricting access to add the further metadata entry comprises denying a request to add the further metadata entry.

56. The article of manufacture defined in claim 54 wherein the method further comprises publishing sequence numbers corresponding to entries in the set while preventing addition of further metadata entries.

57. The article of manufacture defined in claim 54 wherein restricting access comprises:
adding the second metadata entry to the set;
charging a fee; and
preventing publication of a sequence number associated with the second metadata entry when one or more other sequence numbers associated with one or more entries in the set are published until after receiving an indication that payment has been received.

58. An apparatus comprising:
a processor;
an input to receive first and second metadata entries;
a document processing unit to add the first and second metadata entries to a set corresponding to a digital object;
a memory to store the entries; and
an access processing unit coupled to the memory to provide access to first and second unique identifiers, the first and second unique identifiers referencing the first and second metadata entries respectively, the first and second unique identifiers are hash values resulting from applying a function to contents of the first and second metadata entries respectively, wherein an order of the first and second metadata entries in the set is established by an order of the first and second unique identifiers, and to access the first and second metadata entries using the first and second unique identifiers as indices;
the input to further receive a third unique identifier that references the set, wherein the third unique identifier corresponding to the digital object comprises a hash value that is a result of application of a hash function that maps an arbitrary sequence of bytes associated with the digital object into a fixed size sequence;
a hash computing unit to compute a hash of the digital object; and
an encryption unit to encrypt at least one of the digital object, the first metadata entry, and the second metadata entry using an encryption key that is a function of the content of the digital object, and to create the encrypted version of the digital object by applying a hash function to the content of the digital object, wherein the encryption key is a function of an encrypted version of the digital object.

59. The apparatus defined in claim 58 wherein the first and second unique identifiers are results of computing a hash value based on contents of the first and second metadata entries, respectively.

60. The apparatus defined in claim 58 wherein the document processing unit canonically orders the first and second metadata entries.

61. The apparatus defined in claim 58 wherein the access processing unit sends, in response to a request, a distinct sequence number for each entry in the set including the first and second metadata entries along with unique identifiers associated with said each entry.

62. The apparatus defined in claim 58 wherein the first metadata entry corresponds to a description of a transaction and the second metadata entry obtains additional information about the first metadata entry.

63. The apparatus defined in claim 62 wherein the description of the transaction includes an identification of property for sale by a seller.

64. The apparatus defined in claim 58 wherein the first metadata entry corresponds to a description of property for sale by a seller and the second metadata entry corresponds to an indication from a buyer expressing a commitment to purchase the property.

65. The apparatus defined in claim 58 wherein the access processing unit restricts access to add a further metadata entry to the set of entries based on criteria.

66. The apparatus defined in claim 65 wherein the access processing unit restricts access to add the further metadata entry by denying a request to add the further metadata entry.

67. The apparatus defined in claim 65 wherein the access processing unit publishes sequence numbers corresponding to entries in the set while preventing addition of further metadata entries.

68. The apparatus defined in claim 65 wherein the access processing unit restricts access by preventing publication of a sequence number associated with the second metadata entry, after the second metadata entry has been added to the set, when one or more other sequence numbers associated with one or more entries in the set are published until after receiving an indication that payment has been received.

69. An apparatus comprising:
a memory;
a computer processor
means for receiving first and second metadata entries;
means for adding the first and second metadata entries to a set corresponding to a digital object;
means for providing access to first and second unique identifiers, the first and second unique identifiers referencing the first and second metadata entries respectively, the first and second unique identifiers are hash values resulting from applying a function to contents of the first and second metadata entries respectively, wherein an order of the first and second metadata entries in the set is established by an order of the first and second unique identifiers;
means for accessing the first and second metadata entries using the first and second unique identifiers as indices;
means for receiving a third unique identifier that references the set, wherein the third unique identifier corresponding to the digital object comprises a hash value that is a result of applying a hash function that maps an arbitrary sequence of bytes associated with the digital object into a fixed size sequence;
means for computing a hash of the digital object;
means for encrypting at least one of the digital object, the first metadata entry, and the second metadata entry using an encryption key that is a function of the content of the digital object, wherein the encryption key is a function of an encrypted version of the digital object; and
means for creating the encrypted version of the digital object by applying a hash function to the content of the digital object.

\* \* \* \* \*